United States Patent
Deng et al.

(10) Patent No.: US 9,572,044 B2
(45) Date of Patent: *Feb. 14, 2017

(54) MOBILE BROADCAST-BASED LOCATION DETERMINATION METHOD AND APPARATUS

(75) Inventors: Zhongliang Deng, Beijing (CN); Lianming Xu, Beijing (CN); Yanpei Yu, Beijing (CN); Xie Yuan, Beijing (CN); Risu Na, Beijing (CN); Hemin Li, Beijing (CN); Qifeng Lai, Beijing (CN); Yaoyu Deng, Beijing (CN); Huli Shi, Beijing (CN); Ziping Lv, Beijing (CN)

(73) Assignees: BEIJING UNIVERSITY OF POSTS AND TELECOMMUNICATIONS, Beijing (CN); BEIJING SHOUKEXINTONG SCIENCE & TECHNOLOGY CO., LTD., Beijing (CN)

( * ) Notice: Subject to any disclaimer, the term of this patent is extended or adjusted under 35 U.S.C. 154(b) by 444 days.

This patent is subject to a terminal disclaimer.

(21) Appl. No.: 13/992,449

(22) PCT Filed: Jun. 8, 2011

(86) PCT No.: PCT/CN2011/075469
§ 371 (c)(1),
(2), (4) Date: Jul. 30, 2013

(87) PCT Pub. No.: WO2012/079347
PCT Pub. Date: Jun. 21, 2012

(65) Prior Publication Data
US 2013/0324158 A1    Dec. 5, 2013

(30) Foreign Application Priority Data
Dec. 13, 2010    (CN) .......................... 2010 1 0602341

(51) Int. Cl.
*H04W 64/00* (2009.01)
*H04W 4/02* (2009.01)
(Continued)

(52) U.S. Cl.
CPC ............... *H04W 24/00* (2013.01); *G01S 5/02* (2013.01); *G01S 5/0252* (2013.01); *G01S 5/0257* (2013.01); *H04W 4/02* (2013.01); *H04W 24/10* (2013.01)

(58) Field of Classification Search
CPC ............................. H04W 64/00; H04W 4/02
(Continued)

(56) References Cited

U.S. PATENT DOCUMENTS

2003/0052822 A1*   3/2003   Rabinowitz et al. ......... 342/464
2005/0181809 A1*   8/2005   Hild et al. ................ 455/456.5
(Continued)

FOREIGN PATENT DOCUMENTS

CN    101086526 A    12/2007
CN    101344584 A    1/2009
(Continued)

OTHER PUBLICATIONS

International Search Report PCT/CN2011/075469 dated Sep. 29, 2011(submitted in Chinese).
(Continued)

*Primary Examiner* — Lester Kincaid
*Assistant Examiner* — Daniel G Bassett
(74) *Attorney, Agent, or Firm* — Daniel J. Chalker; Edwin S. Flores; Chalker Flores, LLP (57) ABSTRACT

The present invention, pertaining to the field of wireless communications, discloses a mobile broadcast-based method and apparatus that includes: receiving a mobile broadcast signal; demodulating a location spreading signal inserted in the header of a time slot or a transmission frame
(Continued)

of the mobile broadcast signal to acquire navigation message information, and measuring and acquiring location characteristic parameters, wherein the navigation message information includes the identifier of a mobile broadcast station, and the location characteristic parameters correspond to the identifier; and acquiring location data according to the location characteristic parameters and the navigation message information. According to the method and apparatus, a location spreading signal is carried in the header of a time slot or in the header of a transmission frame of the mobile broadcast signal, navigation message information is acquired by demodulating the location spreading signal, and location characteristic parameters are acquired by measurement to acquire location data.

15 Claims, 7 Drawing Sheets

(51) Int. Cl.
*G01S 5/02* (2010.01)
*H04W 24/00* (2009.01)
*H04W 24/10* (2009.01)

(58) Field of Classification Search
USPC ........................................... 455/456.1
See application file for complete search history.

(56) References Cited

U.S. PATENT DOCUMENTS

| | | | |
|---|---|---|---|
| 2006/0116818 A1* | 6/2006 | Chao et al. | 701/211 |
| 2009/0115661 A1* | 5/2009 | Torimoto et al. | 342/387 |
| 2009/0175379 A1* | 7/2009 | Rubin et al. | 375/295 |
| 2009/0286556 A1* | 11/2009 | Yumoto et al. | 455/456.6 |
| 2010/0091614 A1* | 4/2010 | Fujisawa | 368/14 |
| 2011/0164690 A1* | 7/2011 | Ramesh et al. | 455/226.1 |

FOREIGN PATENT DOCUMENTS

| | | |
|---|---|---|
| CN | 101616482 A | 12/2009 |
| JP | 2006220586 A | 8/2006 |

OTHER PUBLICATIONS

CN 201010602341.8 Office Action Issued Jan. 13, 2013. [English Translation of Office Action and Search Report].

* cited by examiner

MOBILE BROADCAST-BASED LOCATION DETERMINATION METHOD AND APPARATUS

This application claims priority to Chinese Patent Application No. 201010602341.8, filed before Chinese Patent Office on Dec. 13, 2010 and entitled "MOBILE BROADCAST-BASED LOCATION METHOD AND APPARATUS", which is incorporated herein by reference in its entirety.

FIELD OF THE INVENTION

The present invention relates to the field of wireless communications, and in particular, to a mobile broadcast-based location method and apparatus.

BACKGROUND OF THE INVENTION

Location-based services (LBS) are a class of value-added services providing location-based navigation and inquiry services for users over a mobile communication network by using wireless location technologies in cooperation with a Geographic Information System (GIS), which represent a combination of the spatial information technology and the wireless communication technology. In recent years, progress in the radio technology and the wireless local area (WLAN) technology and increase of location service demands promote the development of the location technology. Demands on the LBS are ever increasing. The location technology is extremely important, especially in emergencies. Therefore, LBS-based wireless location applications see a broad and promising market.

Currently, LBS include three location methods: Global Positioning System (GPS) location, wireless network location, and hybrid location. The hybrid location is a combination of the GPS location and the wireless network location, and is the most commonly used location method. This is because if only the GPS receiver is used for location, a location failure might happen due to difficulty of receiving GPS signals from a satellite among blocks in downtown areas or within buildings. In the field of mobile communication, the following traditional location methods are available:

Cell of Origin (COO) is a location technology which determines the location of a user by collecting the identifier of a cell which the mobile station belongs to. This technology is simple but achieves poor accuracy, failing to satisfy requirements of majority of users.

Enhanced Observed Time Difference (E-OTD) is implemented by deploying reference points. The system distributes reference points among a plurality of stations deployed in a large area, as location measurement units covering the wireless network. Each reference point has an accurate clock source. When an E-OTD-enabled mobile phone and the location measurement units receive signals from at least three base stations, the time difference from each of the base stations to the mobile phone and the location measurement units can be calculated. Based on the calculated time differences, the location of the mobile phone is estimated. This solution is, however, complicated.

Assisted GPS (A-GPS) is a system where a plurality of GPS receivers are deployed at locations at which signals are successfully received from a satellite. In the A-GPS, the received assisted GPS signals are sent to a mobile phone over a communication network; and a mobile phone equipped with a GPS calculation chip calculates the location of the mobile phone according to the GPS location data transmitted over the communication network, with location accuracy of within 10 meters. However, this solution, compared with the E-TOD technology, has higher requirements on both the network and the mobile phone.

In addition, the Angle of Arrival (AOA) location technology and the Time of Arrival (TOA) location technology are available. The AOA location technology is to determine the location of a mobile station according to angles of arrival of signal from a mobile station to two base stations. The TOA location technology is to determine the location of a mobile station by measuring the time from being sent from the mobile station to arrival at a message measurement unit.

The prior art further provides a location method for use in a mobile communication system, where a mobile terminal is located by matching a group of actual signal parameter information acquired during location, and a base station identifier corresponding to each actual signal parameter information, with a statistical value for each group of signal parameters measured in advance in different sub-areas and a base station identifier corresponding to each actual signal parameter information. This improves location speed and accuracy. However, a mobile base station achieves a poor signal coverage, location accuracy according to the location method in the prior art still needs to be improved. In addition, if a large number of mobile terminals communicate with the base station for location, communication resources will be occupied.

SUMMARY OF THE INVENTION

The present invention is directed to providing a mobile broadcast-based location method and apparatus. According to the location method and apparatus, a spread spectrum signal for positioning is carried in the header of a time slot or the header of a transmission frame of a mobile broadcast signal, location characteristic parameters are acquired by demodulating the spread spectrum signal for positioning, and then location data is acquired according to the location characteristic parameters. This effectively improves the location accuracy.

In view of the above, an embodiment of the present invention provides a mobile broadcast-based location method, including the following steps:

receiving a mobile broadcast signal;

demodulating a spread spectrum signal for positioning inserted in the header of a time slot or in the header of a transmission frame of the mobile broadcast signal to acquire navigation message information, and measuring and acquiring location characteristic parameters acquiring location data according to the location characteristic parameters and the navigation message information.

Specifically, the location characteristic parameters include one or a plurality of a signal delay value, a signal delay difference, a signal strength, an angle of signal arrival, from each of mobile broadcast base stations to the terminals.

preferably, the location characteristic parameters include the signal delay difference from each of the mobile base stations to the terminals, the navigation message information further includes a time correction parameter, and prior to the acquiring location data according to the location characteristic parameters and the navigation message information, the method further includes: correcting the signal delay difference by using the time correction parameter.

Alternatively, the acquiring location data according to the location characteristic parameters and the navigation message information specifically includes: sending the location characteristic parameters and the navigation message information to a network side location server, and receiving the location data from the network side location server; or acquiring the location data by a location terminal by using a characteristic matching technology; or acquiring the location data by a location terminal by using a geometric location technology, where the navigation message information further includes location information of the mobile broadcast base station.

Preferably, the method further includes: measuring an atmospheric pressure by using a barometric pressure sensor, calculating an altitude value according to the measured atmospheric pressure, and correcting, by using the altitude value, the acquired location data to acquire final location data.

Preferably, if the mobile broadcast signal is a China Mobile Multimedia Broadcasting (CMMB) signal, the spread spectrum signal for positioning fills in a position of a transmitter identifier and the front part of a first synchronization signal in each of the time slots; if the mobile broadcast signal is a Digital Audio Broadcasting signal, the spread spectrum signal for positioning fills in a position of a NULL symbol of each of the transmission frames.

An embodiment of the present invention further provides a mobile broadcast-based location apparatus, including a receiving module, a demodulation module, and a location data acquisition module. The receiving module is configured to receive a mobile broadcast signal; the demodulation module is configured to demodulate a spread spectrum signal for positioning_inserted in the header of a time slot or in the header of a transmission frame of the mobile broadcast signal to acquire navigation message information, and measure and acquire location characteristic parameters, where the navigation message information includes the identifier of a mobile broadcast station, and the location characteristic parameters correspond to the identifier; and the location data acquisition module is configured to acquire location data according to the location characteristic parameters and the navigation message information.

Preferably, the apparatus further includes a communication module, configured to send the navigation message information acquired by the reception demodulation module and the location characteristic parameters acquired by the measurement module to a network side location server, and receive the location data from the network side location server.

Preferably, the apparatus further includes a location database, configured to store the location characteristic parameters and the location data, where the location data acquisition module acquires the location data by search in the location database by using a characteristic matching technology.

Preferably, the mobile broadcast-based location apparatus further includes a barometric pressure measurement module and a location data correction module, where the barometric pressure measurement module is configured to measure an atmospheric pressure, and the location data correction module is configured to acquire an altitude value according to the atmospheric pressure measured by the barometric pressure measurement module, and correct, by using the altitude value, the location data acquired by the location data acquisition module to acquire final location data.

The technical solutions according to the embodiments of the present invention achieve the following beneficial effects:

According to the mobile broadcast-based location method and apparatus provided in the embodiments of the present invention, a spread spectrum signal for positioning is carried in the header of a time slot or the header of a transmission frame of a mobile broadcast signal, location characteristic parameters are acquired by demodulating the spread spectrum signal for positioning, and then location data is acquired according to the location characteristic parameters. Since a mobile broadcast system achieves a wide signal coverage, the location accuracy can be effectively improved by carrying the spread spectrum signal for positioning over the mobile broadcast signal. In addition, the mobile broadcast-based location method and apparatus according to the embodiments of the present invention are compatible with original mobile broadcast system, which does not affect the function of receiving mobile broadcast signals of a terminal in the original system, and is simple to implement.

BRIEF DESCRIPTION OF DRAWINGS

For a better understanding of the technical solutions in the embodiments of the present invention, the accompanying drawings for illustrating the embodiments are briefly described below. Apparently, the accompanying drawings in the following description illustrate only some embodiments of the present invention, and a person skilled in the art can derive other accompanying drawings from these accompanying drawings without any creative efforts.

DETAILED DESCRIPTION OF THE EMBODIMENTS

To make the objectives, technical solutions, and advantages of the present invention clearer, the following describes the embodiments of the present invention in detail below with reference to the accompanying drawings.

Embodiments of the present invention provide a mobile broadcast-based location method and apparatus. According to the location method and apparatus, a spread spectrum signal for positioning is carried in the header of a time slot or the header of a transmission frame of a mobile broadcast signal, location characteristic parameters are acquired by demodulating the spread spectrum signal for positioning, and then location data is acquired according to the location characteristic parameters. This effectively improves the location accuracy.

Figure 1:
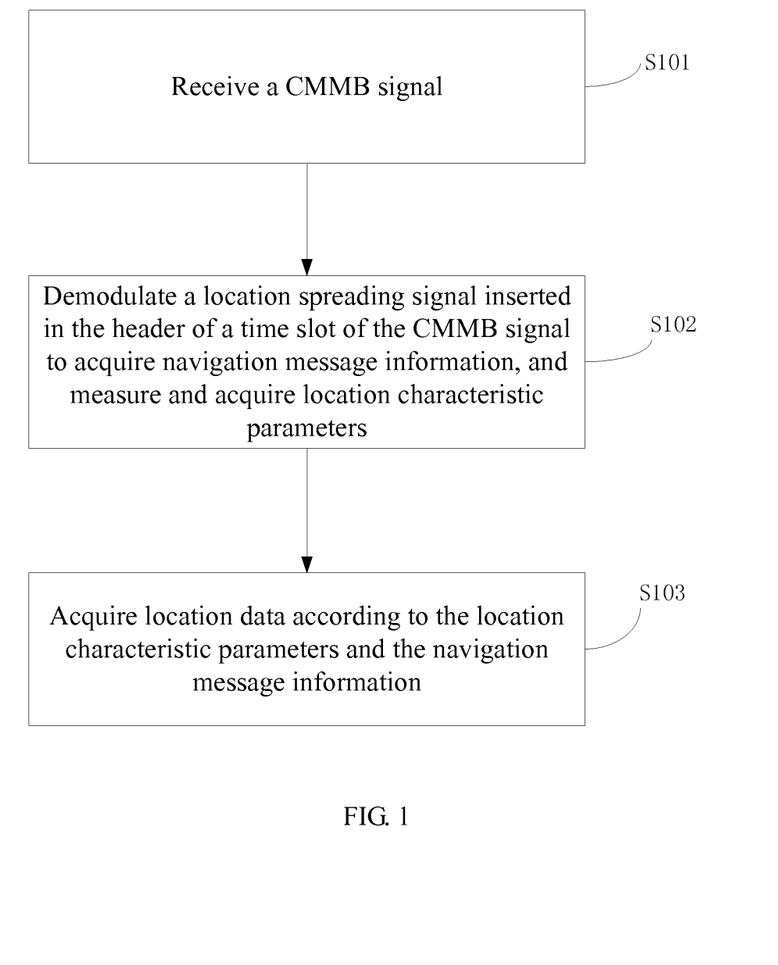
FIG. 1 is a flowchart of a mobile broadcast-based location method according to an embodiment of the present invention.

FIG. 1 is a flowchart of a mobile broadcast-based location method according to an embodiment of the present invention. This embodiment uses a CMMB signal as an example to describe the mobile broadcast-based location method in detail. The method according to this embodiment includes the following steps:

Step S101: receiving a CMMB signal.

Specifically, a CMMB receive antenna may be used to receive a CMMB signal, and then the CMMB signal is processed by using the RAKE receiver equalization estimation technology. In this way, multi-path interference is effectively suppressed, bit error performance is improved, and the performance of the measurement system and the location accuracy are enhanced. In addition, correlation interference may also be suppressed by using the frequency difference factor-based parallel cross-correlation subtraction method. The RAKE receiver equalization estimation technology and the factor-based parallel cross correlation subtraction method are both commonly known for a person skilled in the art, which are thus not described herein any further.

Step S102: demodulating a spread spectrum signal for positioning inserted in the header of a time slot of the CMMB signal to acquire navigation message information, and measuring and acquiring location characteristic parameters.

The navigation message information includes the identifier of a CMMB base station, the identifier of a city, and location information of the base station sending the signal. Further, the location characteristic parameters include one or a plurality of a signal delay value, a signal delay difference, a signal strength, an angle of signal arrival, from each of mobile broadcast base stations to the terminals. As a preferred embodiment of the present invention, in this embodiment, the location characteristic parameters include a signal delay difference and a signal strength from each of CMMB base stations to the location terminals; and the navigation message information includes the identifier of a mobile broadcast base station, and a time correction parameter. The time correction parameter is used to indicate difference of the time of sending signals by different base stations. After the signal delay difference is acquired, the signal delay difference is corrected by using the time correction parameter.

Figure 2:
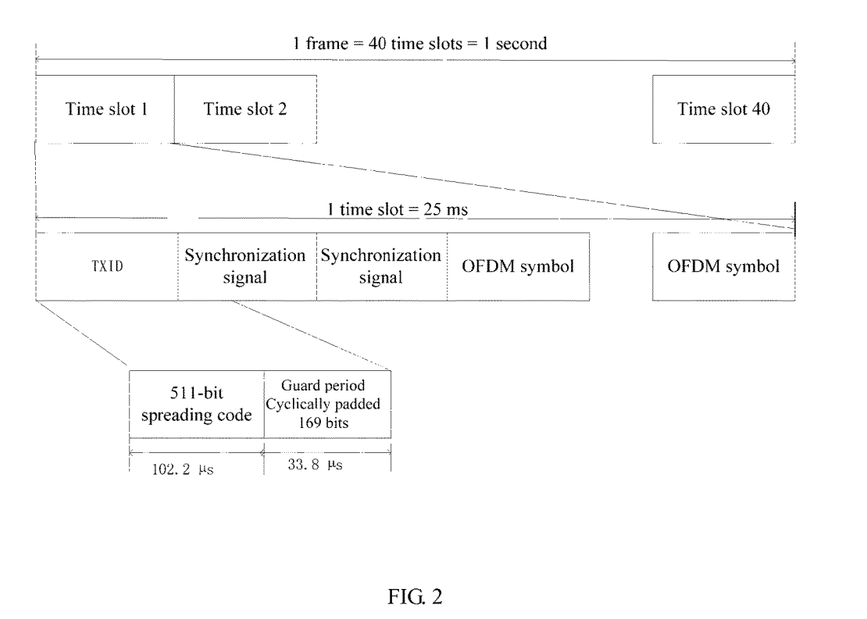
FIG. 2 is a schematic diagram of a frame structure of a CMMB signal in the location method illustrated in FIG. 1.

In this embodiment, the spread spectrum signal for positioning in the header of the time slot of the CMMB signal is generated as follows:

The spread navigation message information using the spreading code is filled in the position of a TXID signal and the first 102.2 µs of a first synchronization signal of the CMMB signal, and the following 33.8 µs is used as a guard interval, and filled with the spreading code. FIG. 2 illustrates a frame structure of the CMMB signal according to this embodiment. Each frame (1 s) is divided into 40 time slots, in each time slot (25 ms), the first 136-µs segment (including a 36-µs TXID and a 100-µs synchronization symbol) of CMMB data is replaced with 511-bit Gold code for use in acquired and track demodulation. Since the CMMB signal includes two segments of synchronization signals, and after a spreading code is inserted in the 100-µs time segment of the first synchronization signal, synchronization and channel estimation can still be performed, a Code Division Multiple Access (CDMA) spread spectrum signal for positioning may be inserted in the 36-µs TXID segment and the first 100 µs of the first synchronization signal, 136 µs in total. The first 102.2 µs is filled with a 511-bit Gold code, and the remaining 33.8 µs is used as a guard interval. Another 169 bits are cyclically filled. The 680-bit spreading code is modulated into a 1-bit message, a valid spreading gain is at least 27.08 dB, and the spread spectrum signal for positioning amplitude is the same as that of a subcarrier of the CMMB data.

Figure 3:
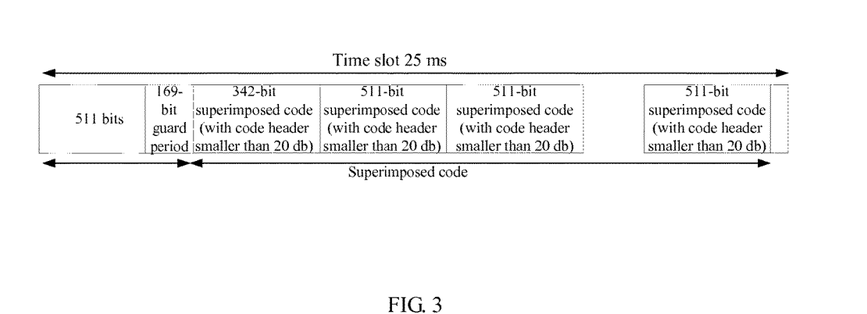
FIG. 3 is a schematic diagram of a spread spectrum signal for positioning_insertion manner in the location method illustrated in FIG. 1.

Further, the spreading code may also be superposed in the remaining part of each time slot of the CMMB signal. FIG. 3 illustrates a superposition manner. Specifically, the superposition spreading code may also use the 511-bit Gold code sequence. The remaining CMMB data portion, except the first 136-µs time segment, in each of the time slots, is cyclically superposed with the 511-bit Gold code sequence, and the phase of the superposed code is continuous with the code phase in the header of the time slot. The code signal is superposed over the CMMB data in such a manner of 20 dB weaker than the CMMB signal energy to assure that no interference is caused by superposed code signal to normal reception of the CMMB signal.

The spreading code may also be an LAS code or M sequence with zero correlation window greater than 128, and multiple access interference may be suppressed by using the cross-correlation mitigation algorithm.

During demodulation of a spread spectrum signal for positioning, the location of the header of a time slot may be determined firstly according to a conventional system solution of CMMB, the spread spectrum signal for positioning inserted in the header of the time slot is acquired and demodulated in the header of the time slot, and a location characteristic signal is measured. After the acquired, in the tracking state, long-time correlation accumulation is performed by using consecutively superposed superposition spreading codes such that measurement accuracy and measurement stability of characteristic information are improved.

Step S103: acquiring location data according to the location characteristic parameters and the navigation message information.

Specifically, the characteristic matching technology is preferably used for location. Alternatively, the location data can be acquired from a location database of the mobile terminal by using the characteristic matching technology according to the location characteristic parameters. Alternatively, the location characteristic parameters may also be sent to a network side location server such that the network side location server searches for and acquires the location data by using the characteristic matching technology, and then returns the location data to the mobile terminal. The characteristic matching technology has been fully disclosed in the Chinese patent application No. 200910090194.8. The location determination method of searching a location database by using a location server includes the following: a mobile terminal receives a location service request of a user; the mobile terminal sends the location service request and a group of actual signal delay differences to a base station of a cell in which the mobile terminal is located; the base station of the cell in which the mobile terminal is located sends the received location service request to a location server; after receiving actual signal parameter information, the location server searches a location database for a group of signal delay difference statistical values matching with the group of actual signal delay differences; the location server sends location statistical information corresponding to the found group of signal delay difference statistical values as a location result, to the base station of the cell in which the mobile terminal is located; and the base station of the cell in which the mobile terminal is located forwards the location result to the mobile terminal after receiving the location result. It should be supplemented that if the characteristic matching technology is used for location, the location characteristic parameters may further include a primary-path delay value and a multi-path signal delay value. With respect to the CDMA spreading signal added in the mobile broadcast, that is, multiple paths of the location spreading signal, when the difference between a multi-path delay and a primary-path delay exceeds the duration of two CDMA spreading codes, it is likely to simultaneously detect the primary-path delay value and the multi-path delay value using the self-correlation feature of the spreading code. The multi-path delay changes as user location changes. Therefore, the multi-path signal delay can serve as the location characteristic parameter. For example, the primary-path delay value of a signal at a location, the delay value of a multi-path signal 1, and the delay value of a multi-path signal 2 are recorded in a database. . . . When a user is being located, the measured primary-path delay value and multi-path signal delay value are compared with the primary-path delay values and multi-path signal delay values at various locations recorded in the database. The location with the most similar result is the location of the user. In addition, this step may also be implemented by using the geometric location technology. In this case, the navigation message information includes location information of a CMMB base station.

According to the mobile broadcast-based location method provided in this embodiment, a spread spectrum signal for positioning is carried in the position of a TXID field and the front part of a first synchronization signal of a time slot of a CMMB signal, navigation message information is acquired by demodulating the spread spectrum signal for positioning, and location characteristic parameters are measured, and then location data is acquired according to the location characteristic parameters and the navigation message information. Since a CMMB system achieves a wide signal coverage, the location accuracy can be effectively improved by carrying the spread spectrum signal for positioning over the CMMB signal. In addition, the mobile broadcast-based location method and apparatus according to the embodiments of the present invention are compatible with original mobile broadcast system, which does not affect the function of receiving mobile broadcast signals of a terminal in the original system, and is simple to implement. Further, this embodiment uses a signal delay difference as the location characteristic parameter such that an error caused by out-of-sync between a terminal and a base station is eliminated; the correction of the signal delay difference by using a time correction parameter achieves a higher delay characteristic accuracy is acquired and hence improves location accuracy.

Figure 4:
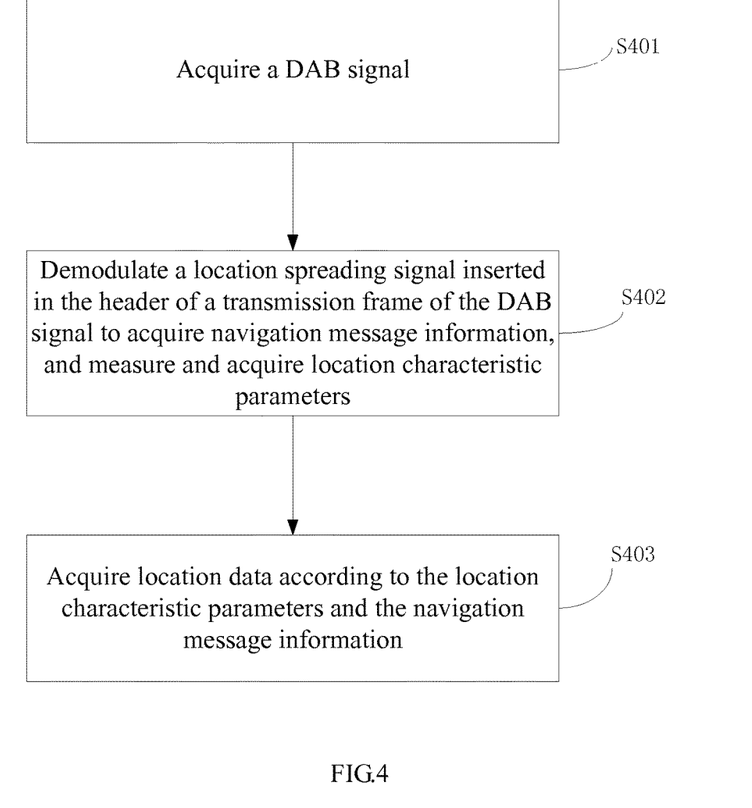
FIG. 4 is a flowchart of a mobile broadcast-based location method according to another embodiment of the present invention.

FIG. 4 is a flowchart of a mobile broadcast-based location method according to another embodiment of the present invention. This embodiment uses a DAB signal as an example to describe the location method in detail. The method according to this embodiment specifically includes the following steps:

Step S401: receiving a DAB signal.

Specifically, the CMMB signal can be processed by using the RAKE receiver equalization estimation technology. In this way, multi-path interference is effectively suppressed, bit error performance is improved, and the performance of the measurement system and the location accuracy are enhanced. In addition, correlation interference may also be suppressed by using the parallel correlation subtraction method. The RAKE receiver equalization estimation technology and the factor-based parallel cross correlation subtraction method are both commonly known for a person skilled in the art, which are thus not described herein any further.

Step S402: demodulating a spread spectrum signal for positioning inserted in the header of a transmission frame of the DAB signal to acquire navigation message information, and measuring and acquiring location characteristic parameters.

The navigation message information includes the identifier of a DAB base station, the identifier of a city, and location information of the base station sending a signal. The location characteristic parameters include one or a plurality of a signal delay value, a signal delay difference, a signal strength, an angle of signal arrival, from each of DAB base stations to the terminals. As a preferred embodiment of the present invention, in this embodiment, the location characteristic parameters include a signal delay difference and a signal strength from each of DAB base stations to the location terminals; and the navigation message information includes the identifier of a DAB base station, and a time correction parameter. The time correction parameter is used to indicate different steps of the time of sending signals by different base stations. After the signal delay difference is acquired, the signal delay difference is corrected by using the time correction parameter.

Figure 5:
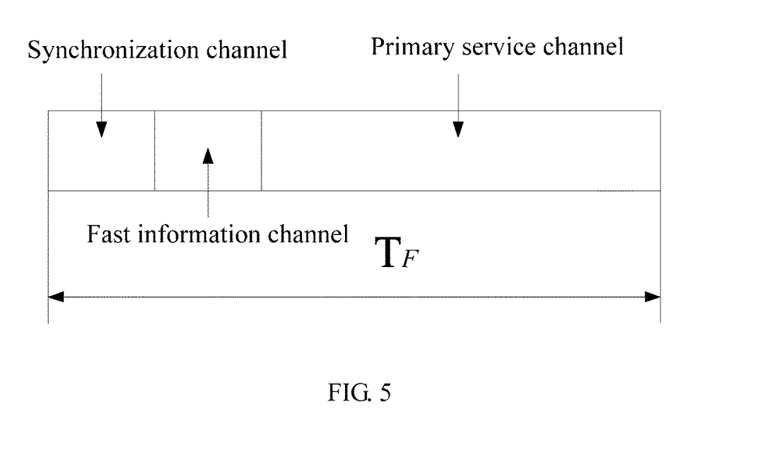
FIG. 5 is a schematic diagram of a channel structure of a DAB signal in the location method illustrated in FIG. 4.
Figure 6:
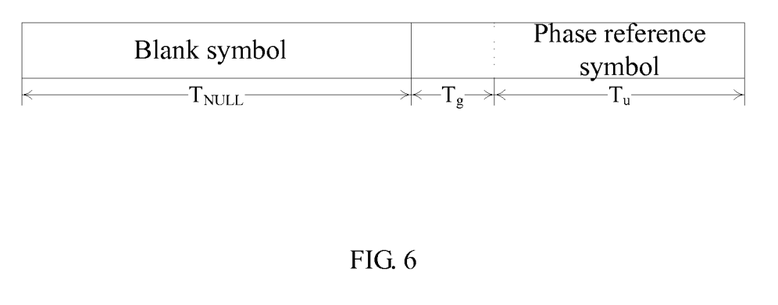
FIG. 6 is a schematic diagram of a frame structure of a synchronization channel.

In this embodiment, the spread spectrum signal for positioning in the header of the transmission frame of the DAB signal is generated as follows:

FIG. 5 illustrates a channel structure of the DAB signal, where a synchronization channel, a fast information channel, and a primary service channel are included. The synchronization channel occupies the first two OFDM symbols in each transmission frame in any transmission mode. As illustrated in FIG. 6, the first OFDM symbol is a NULL symbol with duration of TNULL, and the second symbol is a phase reference symbol (PRS) with the duration of Ts. Each of transmitters in the transmission sites, within the period of the NULL symbol, transmits transmitter information data in the CDMA mode.

Within a Single Frequency Network (SFN), a unique identifier is assigned to each of the transmitters, and different spreading words are assigned to neighboring transmitters. In consideration of multi-path interference, after the transmitter information data is modulated by using the spreading word, the modulated transmitter information data is cyclic-prefix-extended to a time length of TNULL, and the NULL symbol using the synchronization channel is used for data transmission. Further, starting at the start time of the NULL symbol, two segments of 127-bit Gold codes are cyclically filled, and the two segments of 127-bit codes and subsequent 78-bit codes form a 332-bit spreading sequence (a receiver performs demodulation on 254-bit codes, where the first or last 78 bits may be selected for use as a guard interval according to actual situations as long as the 245-bit codes are completely demodulated).

During modulation of the NULL symbol, the energy thereof is controlled to be 10 dB less than the DAB signal energy to ensure that a receiver is capable of performing empty energy detection for synchronization of demodulation of the DAB signal.

Figure 7:
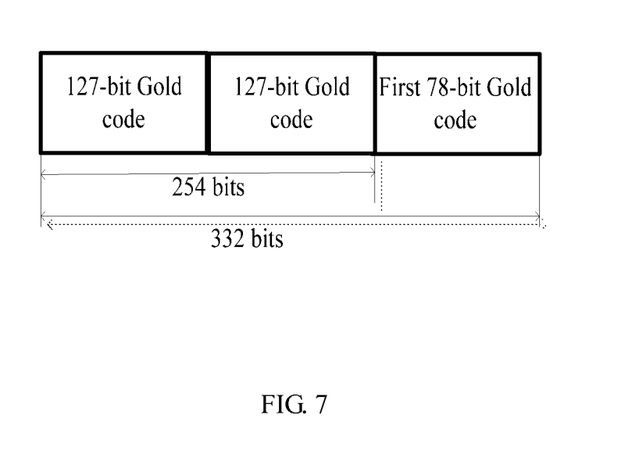
FIG. 7 is a schematic diagram of a spread spectrum signal for positioning insertion manner in the location method illustrated in FIG. 4.

During demodulation of a spread spectrum signal for positioning, the location of the NULL symbol in the header of a transmission frame may be determined firstly according to a conventional system solution of DAB, the spread spectrum signal for positioning inserted in the header of the time slot is acquired and demodulated at the position of the NULL symbol, and a location characteristic signal is measured.

Step S403: acquiring location data according to the location characteristic parameters and the navigation message information.

Specifically, the location data can be acquired from a location database of the mobile terminal by using the characteristic matching technology according to the location characteristic parameters. Alternatively, the location characteristic parameters may also be sent to a network side location server such that the network side location server searches for and acquires the location data by using the characteristic matching technology, and then returns the location data to the mobile terminal. The characteristic matching technology has been fully disclosed in the Chinese patent application No. 200910090194.8, which is thus not described herein any further. In addition, this step may also be implemented by using the geometric location technology. In this case, the navigation message information includes location information of a DAB base station.

According to the mobile broadcast-based location method provided in this embodiment, a spread spectrum signal for positioning is carried in the header of a time slot or the header of a transmission frame of a DAB signal, navigation message information is acquired by demodulating the spread spectrum signal for positioning, and location characteristic parameters are measured, and then location data is acquired according to the location characteristic parameters and the navigation message information. Since a DAB system achieves a wide signal coverage, the location accuracy can be effectively improved by carrying the spread spectrum signal for positioning over the DAB signal. In addition, the mobile broadcast-based location method and apparatus according to the embodiments of the present invention are compatible with original mobile broadcast system, which does not affect the function of receiving mobile broadcast signals of a terminal in the original system, and is simple to implement. Further, this embodiment uses a signal delay difference as the location characteristic parameter such that an error caused by out-of-sync between a terminal and a base station; the correction of the signal delay difference by using a time correction parameter achieves a higher delay characteristic accuracy is acquired and hence improves location accuracy.

Figure 8:
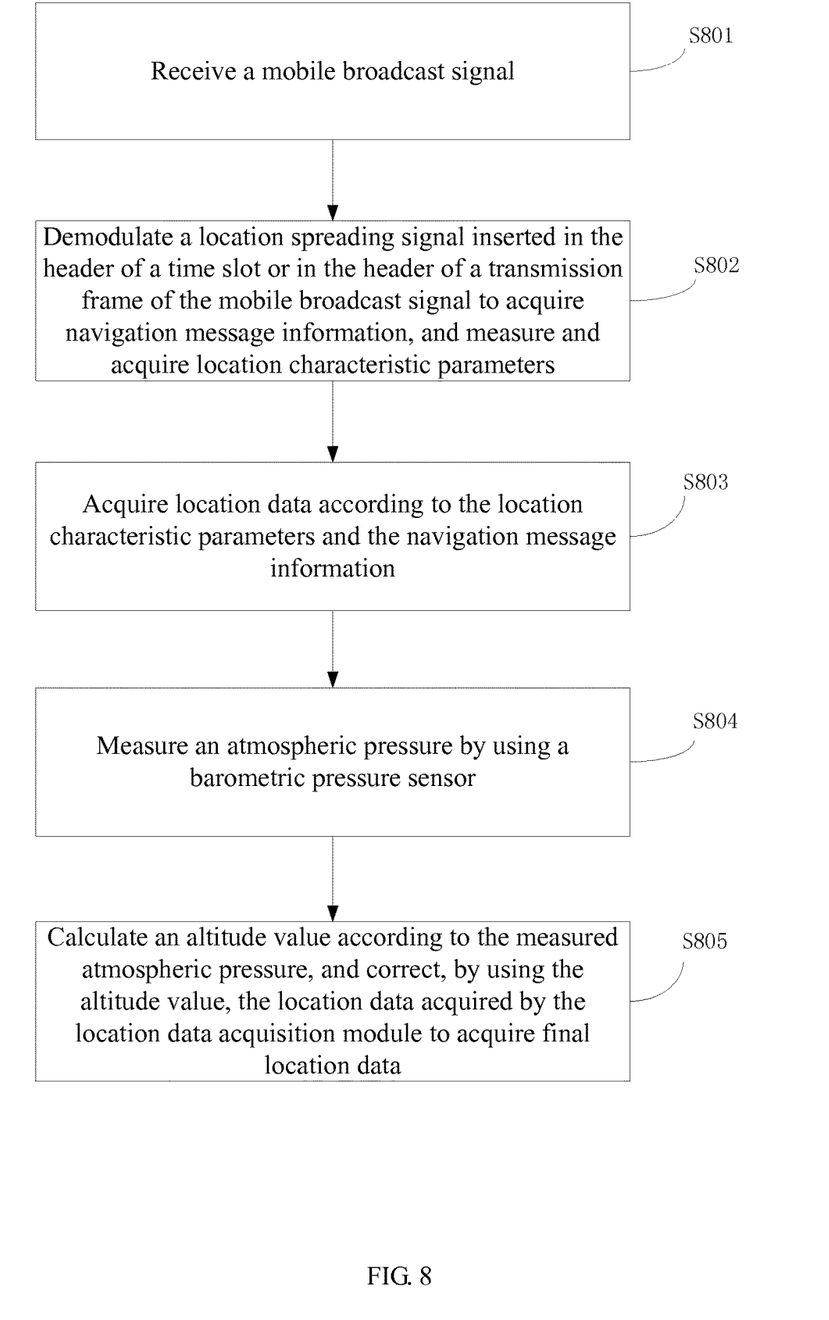
FIG. 8 is a flowchart of a mobile broadcast-based location method according to still another embodiment of the present invention.

FIG. 8 is a flowchart of a mobile broadcast-based location method according to still another embodiment of the present invention. As illustrated in FIG. 8, the mobile broadcast-based location method includes the following steps:

Step S801: receiving a mobile broadcast signal.

Step S802: demodulating a spread spectrum signal for positioning inserted in the header of a time slot or in the header of a transmission frame of the mobile broadcast signal to acquire navigation message information, and measuring and acquiring location characteristic parameters.

The navigation message information includes the identifier of a mobile broadcast base station, the identifier of a city, and location information of the base station sending a signal. The location characteristic parameters include one or a plurality of a signal delay value, a signal delay difference, a signal strength, an angle of signal arrival from each of mobile broadcast base stations to the terminals.

Step S803: acquiring location data according to the location characteristic parameters and the navigation message information.

Specifically, this step can be implemented in the same manner as steps S103 and S403, which is thus not described herein any further.

Step S804: measuring an atmospheric pressure by using a barometric pressure sensor.

Step S805: calculating an altitude value according to the measured atmospheric pressure, and correcting, by using the altitude value, the location data acquired by the location data acquisition module to acquire final location data.

The final location data includes horizontal location information and altitude location information, achieving hierarchical location in terms of altitude.

Barometric altitude measurement works depending on principles that the atmospheric pressure decreases with increase of the altitude in a gravity field, which is denoted by a definite function relationship. Therefore, the atmospheric pressure may be measured by using a barometric pressure sensor, and then the altitude value is calculated according to a relationship between the atmospheric pressure and the altitude. During measurement, the barometric pressure sensor is used to convert a measured atmospheric pressure into an analog voltage signal for output, and convert, by using V/F conversion, the analog voltage signal output by the barometric pressure sensor into a pulse signal having a specific frequency (the frequency linearly varies with the input voltage). A single-chip microcomputer receives the pulse signal, acquires the number of pulses with a unit time, calculates a corresponding actual atmospheric pressure according to a linear relational expression between voltage and frequency, and gives an altitude indication after data processing, thereby implementing differentiation in terms of altitude. Finally, location of a user is calculated according to broadcast location coordinates, pseudo ranges, values read from a barometric altimeter, thereby further improving accuracy in indoor complicated location.

Figure 9:
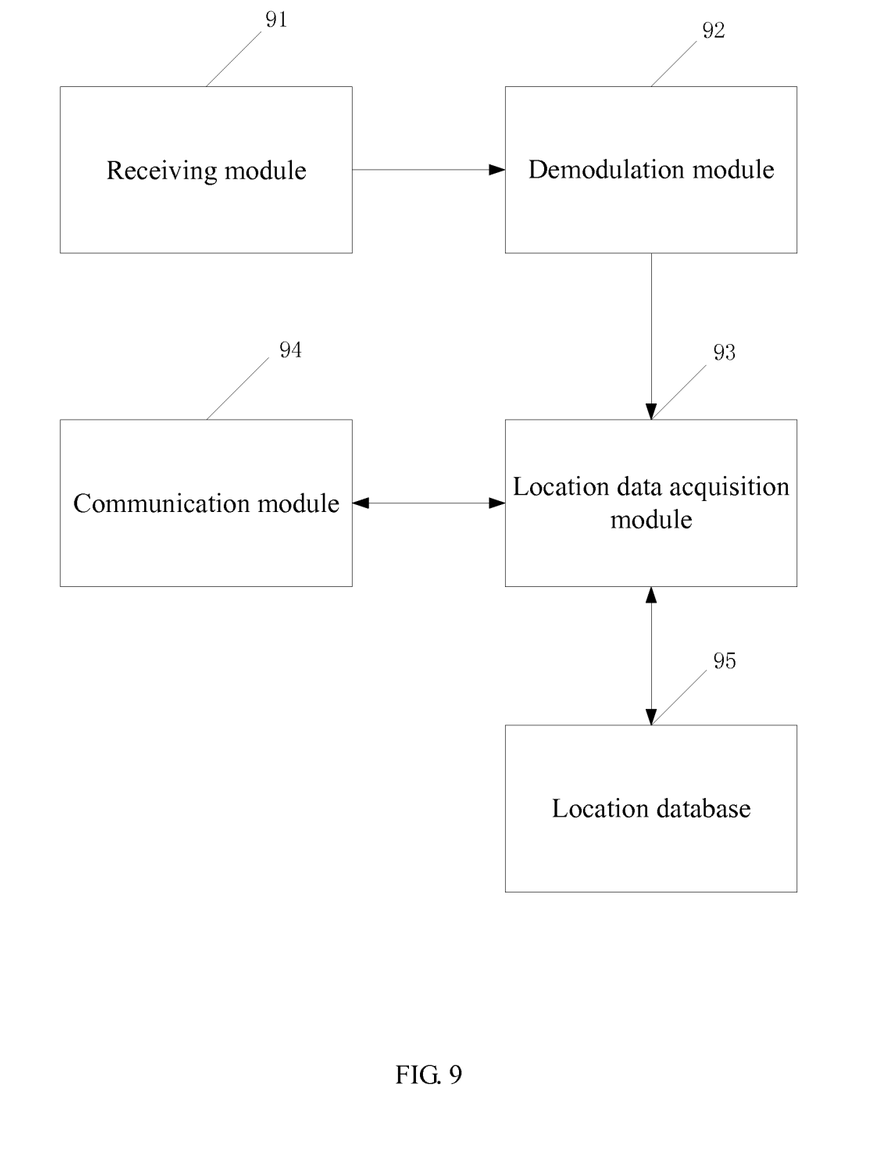
FIG. 9 is a structural block diagram of a mobile broadcast-based location apparatus according to an embodiment of the present invention.

FIG. 9 is a structural block diagram of a mobile broadcast-based location apparatus according to an embodiment of the present invention. As illustrated in FIG. 9, the location apparatus according to this embodiment includes a receiving module 91, a demodulation module 92, and a location data acquisition module 93.

The receiving module 91 is a receive antenna, and is configured to receive a mobile broadcast signal, such as a CMMB signal, a DAB signal, and the like.

The demodulation module 92 is configured to demodulate a spread spectrum signal for positioning inserted in the header of a time slot or in the header of a transmission frame of the mobile broadcast signal received by the receiving module 91 to acquire navigation message information.

The location data acquisition module 93 is configured to acquire location data according to the location characteristic parameters and the navigation message information acquired by the demodulation module 92, including an application processor and a protocol processor.

Further, the location apparatus according to this embodiment further includes a communication module 94 and a location database 95.

The communication module 94 is configured to send the location characteristic parameters and the navigation message information acquired by the demodulation module 92 to a network side location server, and receive the location data from the network side location server.

The location database 95 is configured to store the location characteristic parameters and the location data; and the location data acquisition module 93 is capable of acquiring the location data by search in the location database 95.

The receiving module preferably uses the RAKE receiver equalization estimation technology; applies a correlation receiver on each path, wherein each correlation receiver is related to a delay form of the received signal; and weighting an output of each correlator, and aggregates the weighted outputs into one output to provide signal detection superior over that provided by a single correlator. Subsequently, the demodulation module 92 performs demodulation and decision based on this. Accordingly, the RAKE receiver equalization estimation technology effectively uses multi-path components, collects multi-path energy, and transforms a vector sum to an algebraic sum, thereby effectively reducing the impact caused by multi-path attenuation.

Obviously, the mobile broadcast-based location apparatus provided in the embodiments of the present invention may also acquire location data by query in its own location database, or acquire location data by using the network side location server.

According to the mobile broadcast-based location apparatus provided in this embodiment, a spread spectrum signal for positioning is carried in the header of a time slot or the header of a transmission frame of a mobile broadcast signal, navigation message information is acquired by demodulating the spread spectrum signal for positioning, and location characteristic parameters are measured, and then location data is acquired according to the location characteristic parameters and the navigation message information. Since a mobile broadcast system achieves a wide signal coverage, the location accuracy can be effectively improved by carrying the spread spectrum signal for positioning over the mobile broadcast signal. In addition, the mobile broadcast-based location and apparatus according to the embodiments of the present invention is compatible with an original mobile broadcast system, which does not affect the function of receiving mobile broadcast signals of a terminal in the original system, and is simple to implement.

Figure 10:
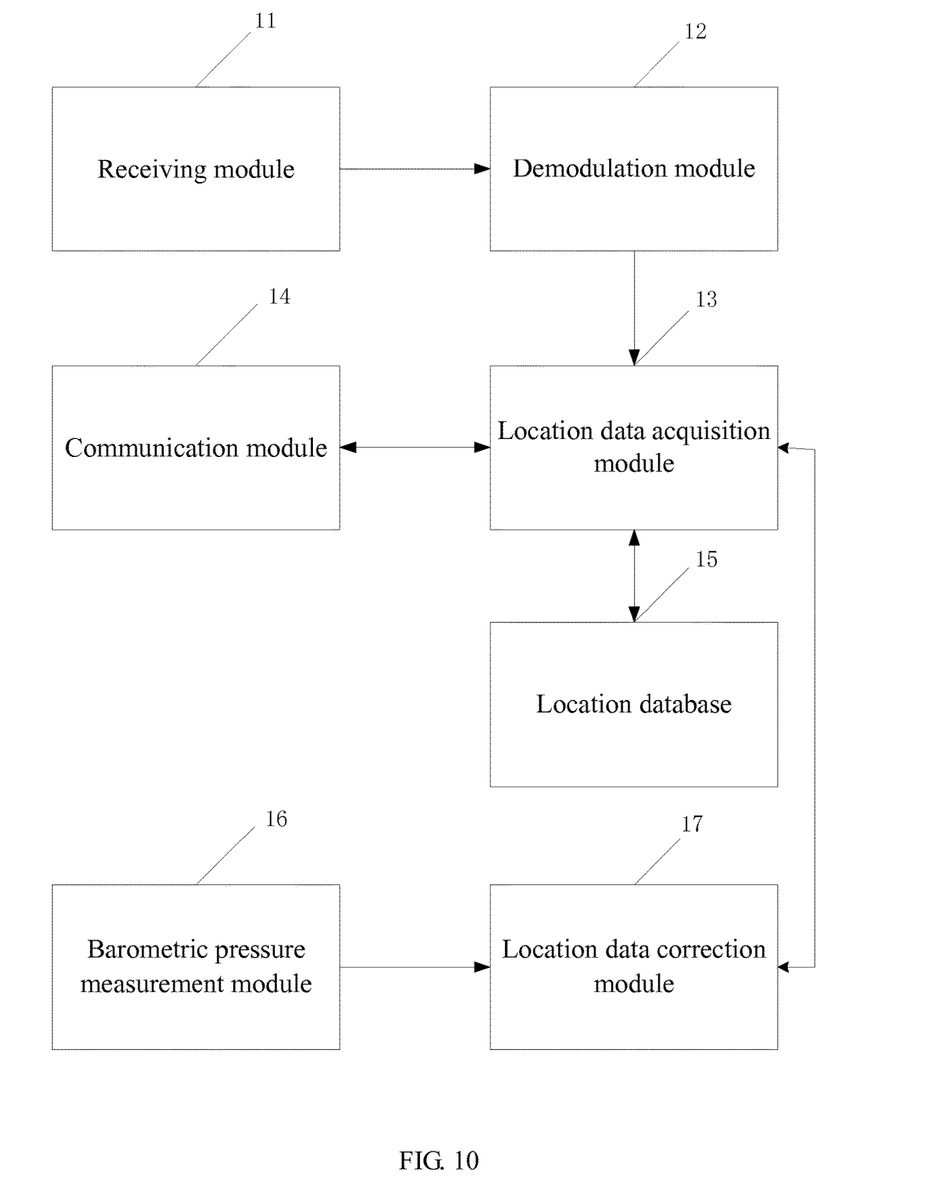
FIG. 10 is a structural block diagram of a mobile broadcast-based location apparatus according to another embodiment of the present invention.

FIG. 10 is a structural block diagram of a mobile broadcast-based location apparatus according to an embodiment of the present invention. As illustrated in FIG. 10, the location apparatus according to this embodiment includes a receiving module 11, a demodulation module 12, a location data acquisition module 13, a communication module 14, a communication module 14, a location database 15, a barometric pressure measurement module 16, and a location data correction module 17.

The receiving module 11 is configured to receive a mobile broadcast signal, such as a CMMB signal, a DAB signal, and the like.

The demodulation module 12 is configured to demodulate a spread spectrum signal for positioning inserted in the header of a time slot or in the header of a transmission frame of the mobile broadcast signal received by the receiving module 11 to acquire navigation message information.

The location data acquisition module 13 is configured to acquire location data according to the location characteristic parameters acquired by the demodulation module 12.

The communication module 14 is configured to send the location characteristic parameters and the navigation message information acquired by the demodulation module 12 to a network side location server, and receive the location data from the network side location server.

The location database 15 is configured to store the location characteristic parameters and the location data; and the location data acquisition module 13 is capable of acquiring the location data by search in the location database 15.

The barometric pressure measurement module 16 is configured to measure an atmospheric pressure.

The location data correction module 17 is configured to calculate an altitude value according to the atmospheric pressure measured by the barometric pressure measurement module 16, and correct the location data acquired by the location data acquisition module 13 to acquire final location data.

According to the mobile broadcast-based location apparatus provided in this embodiment, a spread spectrum signal for positioning is carried in the header of a time slot or the header of a transmission frame of a mobile broadcast signal, location characteristic parameters are acquired by demodulating the spread spectrum signal for positioning, and then location data is acquired by using the characteristic matching technology. Since a mobile broadcast system achieves a wide signal coverage, the location accuracy can be effectively improved by carrying the spread spectrum signal for positioning over the mobile broadcast signal. In addition, the mobile broadcast-based location and apparatus according to the embodiments of the present invention is compatible with an original mobile broadcast system, which does not affect the function of receiving mobile broadcast signals of a terminal in the original system, and is simple to implement. further, altitude location information is corrected by using the barometric pressure measurement module and the location data correction module, the acquired final location data includes horizontal location information and altitude location information. This further improves the location accuracy.

It should be noted that, during occupation detection performed by the apparatus for occupation detection provided in the above embodiments, the apparatus according to the above embodiments is described by only using division of the above functional modules as an example. In practice, the functions may be assigned to different functional modules for implementation as required. To be specific, the internal structure of the apparatus is divided into different functional modules to implement all or part of the above-described functions. In addition, the mobile broadcast-based location method and apparatus provided in the above embodiments pertain to the same concept. For detailed implementation, reference may be made to the apparatus embodiment, which is not described herein any further.

Those of ordinary skilled in the art can understand that all or part of steps of the preceding methods can be implemented by hardware following instructions of programs. The programs may be stored in a computer readable storage medium. The storage medium may be a hard disk, a compact disk-read only memory (CD-ROM), and a floppy disk of a computer.

The above-described embodiments are merely preferred ones of the present invention, and are not intended to limit the protection scope of the present invention. Any equivalent replacements or modifications in terms of structure and procedure, made without departing from disclosure of the specification and drawings of the present invention, or used directly or indirectly in the related technical fields should fall within the scope of the present invention.

What is claimed is:

1. A mobile broadcast-based location method, comprising:
receiving a mobile broadcast signal;
demodulating a spread spectrum signal for positioning inserted in a header of a time slot or in a header of a transmission frame of the mobile broadcast signal to acquire navigation message information, and measuring and acquiring location characteristic parameters, wherein the navigation message information comprises an identifier of a mobile broadcast station, and the location characteristic parameters correspond to the identifier;

acquiring location data according to the location characteristic parameters and the navigation message information; and wherein the spread spectrum signal for positioning fills in a position of a transmitter identifier and the front part of a first synchronization signal in each of the time slots, and spreading codes are superimposed in the remaining portion of each time slot.

2. The method according to claim 1, wherein the location characteristic parameters comprises one or a plurality of a signal delay value, a signal delay difference, a signal strength, an angle of signal arrival, from each of mobile broadcast base stations to a terminal.

3. The method according to claim 2, wherein the location characteristic parameters comprise the signal delay difference from each of the mobile base stations to the terminal, the navigation message information further comprises a time correction parameter, and prior to the acquiring location data according to the location characteristic parameters and the navigation message information, the method further comprises:

correcting the signal delay difference by using the time correction parameter.

4. The method according to claim 1, wherein the acquiring location data according to the location characteristic parameters and the navigation message information specifically comprises:

sending the location characteristic parameters and the navigation message information to a network side location server, and receiving the location data from the network side location server; or acquiring the location data by a location terminal by using a characteristic matching technology; or acquiring the location data by a location terminal by using a geometric location technology, wherein the navigation message information further comprises location information of the mobile broadcast base station.

5. The method according to claim 1, further comprising: measuring an atmospheric pressure by using a barometric pressure sensor, calculating an altitude value according to the measured atmospheric pressure, and correcting, by using the altitude value, the acquired location data to acquire final location data.

6. A mobile broadcast-based location apparatus, comprising:

one or more processors; and
a non-transitory computer-readable storage medium storing one or more programs for execution by the one or more processors, the one or more programs including instructions for:
receiving a mobile broadcast signal;
demodulating a spread spectrum signal for positioning inserted in a header of a time slot or in a header of a transmission frame of the mobile broadcast signal to acquire navigation message information, and measuring and acquiring location characteristic parameters, wherein the navigation message information comprises an identifier of a mobile broadcast station, and the location characteristic parameters correspond to the identifier;
acquiring location data according to the location characteristic parameters and the navigation message information acquired; and wherein the spread spectrum signal for positioning fills in a position of a transmitter identifier and the front part of a first synchronization signal in each of the time slots, and spreading codes are superimposed in the remaining portion of each time slot.

7. The apparatus according to claim 6, the one or more programs including instructions for: sending the navigation message information and the location characteristic parameters to a network side location server, and receiving the location data from the network side location server.

8. The apparatus according to claim 6, further comprising a location database, configured to store the location characteristic parameters and the location data, wherein the one or more programs including instructions for: acquiring the location data by search in the location database by using a characteristic matching technology.

9. The apparatus according to claim 6, the one or more programs including instructions for:

measuring an atmospheric pressure; and
calculating an altitude value according to the atmospheric pressure measured, and correcting the location data by using the altitude value to acquire final location data.

10. The apparatus according to claim 7, the one or more programs including instructions for:

measuring an atmospheric pressure; and
calculating an altitude value according to the atmospheric pressure measured, and correcting the location data by using the altitude value to acquire final location data.

11. The apparatus according to claim 8, the one or more programs including instructions for:

measuring an atmospheric pressure; and
calculating an altitude value according to the atmospheric pressure measured, and correcting the location data by using the altitude value to acquire final location data.

12. The method according to claim 2, wherein the acquiring location data according to the location characteristic parameters and the navigation message information specifically comprises:

sending the location characteristic parameters and the navigation message information to a network side location server, and receiving the location data from the network side location server; or acquiring the location data by a location terminal by using a characteristic matching technology; or acquiring the location data by a location terminal by using a geometric location technology, wherein the navigation message information further comprises location information of the mobile broadcast base station.

13. The method according to claim 3, wherein the acquiring location data according to the location characteristic parameters and the navigation message information specifically comprises:

sending the location characteristic parameters and the navigation message information to a network side location server, and receiving the location data from the network side location server; or acquiring the location data by a location terminal by using a characteristic matching technology; or acquiring the location data by a location terminal by using a geometric location technology, wherein the navigation message information further comprises location information of the mobile broadcast base station.

14. The method according to claim 2, further comprising: measuring an atmospheric pressure by using a barometric pressure sensor, calculating an altitude value according to the measured atmospheric pressure, and correcting, by using the altitude value, the acquired location data to acquire final location data.

15. The method according to claim 3, further comprising: measuring an atmospheric pressure by using a barometric pressure sensor, calculating an altitude value according to the measured atmospheric pressure, and correcting, by using the altitude value, the acquired location data to acquire final location data.

* * * * *